Jan. 18, 1944. J. JANDASEK 2,339,483
TURBO TRANSMISSION
Filed April 23, 1940
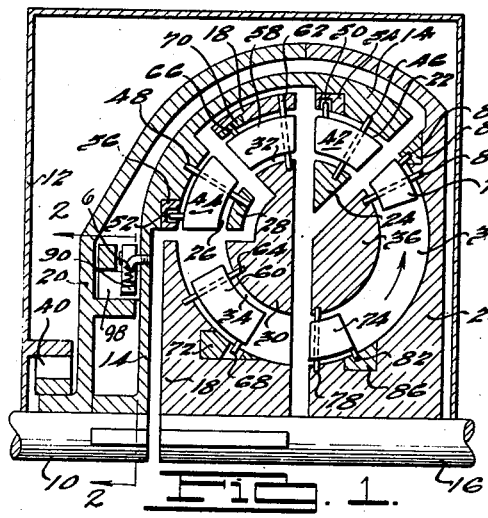
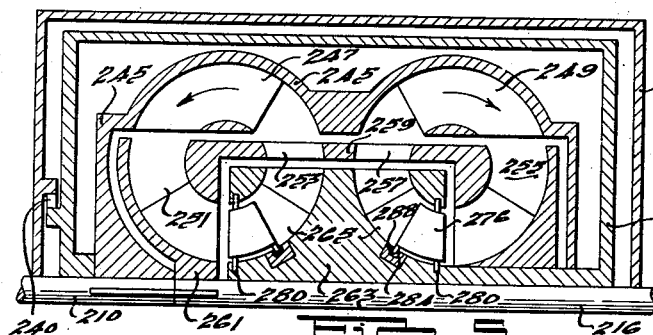
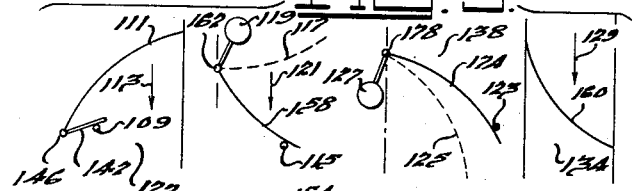
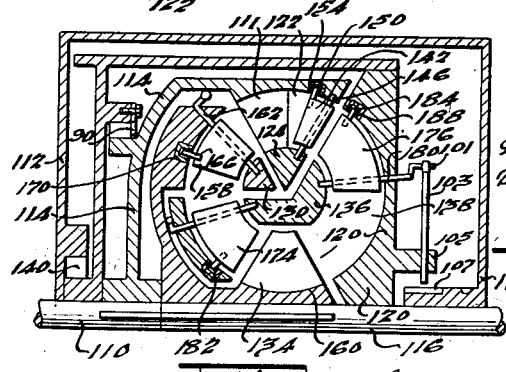
INVENTOR
Joseph Jandasek.
BY Pike, Calver & Gray
ATTORNEYS.

Patented Jan. 18, 1944

2,339,483

UNITED STATES PATENT OFFICE 2,339,483

TURBO TRANSMISSION

Joseph Jandasek, Detroit, Mich., assignor to Bendix Aviation Corporation, South Bend, Ind., a corporation of Delaware Application April 23, 1940, Serial No. 331,199

7 Claims. (Cl. 60—54)

This invention relates to transmissions and more particularly to transmissions of the turbo torque converter type.

An object of the invention is to provide a turbo transmission having a reaction member which may rotate freely or which may be locked against rotation to transmit power at varying torque ratios.

Another object of the invention is to provide a turbo transmission having a releasable reaction member provided with angularly movable vanes which may be actuated angularly by fluid reaction exerted thereon.

A further object is to provide a fluid power transmission wherein rotatable impeller and turbine members may be locked together by any desired means, such for example as a speed responsive clutch mechanism to transmit power at substantially a 1:1 ratio.

Yet a further object of the invention is to provide a fluid power transmission having rotatable impeller, turbine and guide wheel members wherein one-way braking means and speed responsive driving means are provided to selectively induce the elements to rotate at substantially predetermined speed ratios to transmit power as a turbo clutch.

Another object of the invention is to provide a fluid power transmitting mechanism which may selectively and automatically operate as a turbo transmission to transmit power at varying torque ratios and as a turbo clutch to transmit power at substantially a 1:1 ratio.

Yet a still further object is to provide a turbo unit having rotatable impeller turbine and reaction elements wherein means are provided to automatically lock the reaction member to the impeller element when the device reaches its maximum efficiency while operating as a torque converter thereby to convert the device into a turbo clutch to transmit power at a substantially 1:1 ratio.

Another object resides in the provision of a turbo unit having rotatable impeller turbine and guide wheel elements having angularly movable vanes wherein the angular relation of the vanes may automatically vary in response to variations of fluid reaction exerted against the vanes.

Yet a still further object of the invention is to provide means to convert a turbo torque converter into a turbo clutch when the torque converter approaches its point of maximum efficiency.

Another object is to provide means controlled by fluid reaction exerted on the vanes of a reaction member to lock the reaction member against rotation thereby transforming the unit from a turbo clutch into a torque converter.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a sectional view of a turbo unit embodying the present invention.

Fig. 2 is a schematic vertical sectional view of a device embodying one-way driving means and speed responsive clutching means for releasably interconnecting the rotatable elements of the turbo unit.

Fig. 3 is a sectional view taken substantially on the line 3—3 of Fig. 2.

Fig. 4 is a view similar to Fig. 1 showing a modified form of the invention.

Fig. 5 is a diagrammatic view illustrating the angular movements through which the impeller and turbine of Fig. 4 may move.

Fig. 6 is also a diagrammatic view illustrating the operation of the vanes carried by the reaction member of Fig. 4.

Fig. 7 is a line diagram illustrating the change of operation of the device from a torque converter to a turbo clutch or vice versa.

Fig. 8 is a sectional view of a double turbo unit having a plurality of spaced units operable in opposite directions to balance axial thrust.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Fig. 1, it will be observed that a driving shaft 10 projects through a stationary housing 12 and is provided with an impeller web 14. A driven shaft 16 is preferably coaxially aligned with the driving shaft 10 and is provided with a turbine hub 18. A rotatable housing 20 may be loosely mounted on the driven shaft 16 and driving shaft 10.

The impeller web 14 carries a first stage impeller 22 interposed between the web 14 and an impeller shroud 24. The impeller web 14 also is provided with a second stage impeller 26 interposed between the web 14 and an impeller shroud 28.

The turbine web 18 is operably connected with a turbine shroud 30 in such a manner that a first stage turbine 32 and a second stage turbine 34 are interposed between the web 18 and the shroud 30.

The rotatable housing 20 is provided with a reaction shroud member 36 whereby a reaction member 38 is interposed between the second stage turbine 34 and the first stage impeller 22. Oneway braking means 40 may be interposed between the rotatable housing member 20 and the stationary housing member 12 to hold the reaction member 38 against rotation in one direction and to permit it to rotate freely in the opposite direction.

The first and second stage impellers 22 and 26 respectively are each provided with angularly movable vanes 42 and 44 respectively. The vanes 42 and 44 may be pivotally mounted on shafts 46 and 48 projecting into the impeller web 14 and the first stage impeller shroud 24 and the second stage impeller shroud 28 respectively. The angularly movable vanes 42 and 44 are provided with projections 50 and 52 respectively which project into angularly movable rings 54 and 56 respectively carried by the impeller web 14.

The angularly movable rings 54 and 56 carried by the impeller web 14 are provided with yielding means to resiliently urge them toward one angular position substantially as shown in Figs. 2 and 3 of my copending application Serial No. 7,896, now Patent No. 2,205,794.

The first and second stage turbines 32 and 34 respectively are provided with vanes 58 and 60 mounted on shafts 62 and 64 respectively projecting into the turbine web 18 and the turbine shroud 30. The vanes 58 and 60 respectively are provided with projections 66 and 68 respectively projecting into rings 70 and 72 carried by the turbine web 18. The rings 70 and 72 may be urged angularly to align the vanes in a substantially predetermined angular relation as more clearly illustrated in Figs. 2 and 3 in my copending application Serial No. 7,896, now Patent No. 2,205,794.

The reaction member 38 is provided with spaced vanes 74 and 76 mounted on shafts 78 and 80 extending into the rotatable housing 20 and the reaction shroud member 36. Projections 82 and 84 carried by the vanes 74 and 76 project into angularly movable rings 86 and 88 carried by the rotatable housing 20. The rings 86 and 88 may be yieldingly urged to position the vanes in a substantially predetermined angular relation in the manner pointed out above in connection with the impeller and turbine vanes.

Speed responsive driving means 90 may be interposed between axially extending flanges carried by the rotatable housing 20 and the impeller web 14 to lock the reaction member 38 to rotate with the impeller under certain conditions of operation. The speed responsive driving means 90 may be of any desired form, such for example as that illustrated in Figs. 2 and 3 wherein a weight 92, which may be in the form of an arm pivoted at 94 to the impeller web 14, is provided with a pair of spaced surfaces 96 adapted to engage a roller 98 to wedge it between a pair of converging walls 4 and 2 carried by the rotatable member 20 and the impeller web 14 respectively. A spring 6 interposed between a pin 8 and the arm 92 may be provided to yieldingly urge the arm 92 to rotate about the pivot 94 to position the roller 98 in the released position.

The embodiment illustrated in Fig. 4 is similar in many respects to that illustrated in Figs. 1 to 3, and corresponding parts have therefore been given corresponding reference numerals with the addition of 100.

Means operated by variation of the angular position of the vanes 176 of the reaction member 138 are provided to lock the reaction member 138 to the stationary housing 112 under certain operating conditions. One desirable form of this control means comprises one or more crank arms 101 fixed to one or more of the shafts 180 which project through the rotatable housing 120 and extend into the reaction shroud member 136. A connecting rod 103 may be operably connected to the crank arm 101 and extend through a guide member 105 carried by the rotatable housing 120 to engage the splines or gears 107 formed in the stationary housing 112 as illustrated in Fig. 6. In the operation of this device fluid reaction exerted on the reaction vanes 176 rotates the shafts 180 to actuate the connecting rod 103 to move the end of the connecting rod into engagement with the gears 107 to lock the rotatable member 120 to the stationary housing 112 under certain conditions of operation to transform the device into a torque converter.

Referring now to Fig. 5, it will be observed that the impeller vanes 142 pivoted on the shafts 146 are movable angularly from a stop member 109 indicating the light load position to a heavy load position in alignment with a stationary blade 111.

The turbine vanes 158 are movable angularly from a stop member 115 indicating the heavy load position to the dotted line or light load position indicated by the dotted line 117. The vanes 158 may be moved to the dotted line or light load position by means of a weight 119 operably connected to the shaft 162 as indicated. The direction of rotation of the turbine is illustrated by the arrow 121.

The vanes 174 carried by the reaction member are movable from the stop members 123 which indicates the heavy load position to the dotted line position 125 which indicates the light load position. The vanes 174 are fixed to the shaft 178 which may be actuated angularly by means of a weight 127 operably connected to the shaft 178. Under certain conditions of operation the reaction member 138 rotates whereupon the weight 127 becomes subjected to centrifugal force to move the reaction vanes 174 angularly toward the dotted line position whereupon the device operates more efficiently as a turbo clutch. The second stage turbine 134 rotates in the direction of the arrow 129 and the vanes 160 preferably remain in a substantially fixed position.

It will be noted that in the embodiment of Fig. 1 the speed responsive driving means 90 is under the influence of the speed of the impeller whereas in the embodiment of Fig. 4 the speed responsive driving means is under the influence of the reaction or guide wheel speed.

Referring now to Fig. 7, it will be observed that the efficiency of the devices illustrated in Figs 1 and 4 operating as a torque converter during normal operation of a vehicle on the road operating at normal cruising speed is illustrated by the line 131. When the efficiency of the torque converter reaches a peak indicated at the point 133, the speed responsive driving means 90 o:

Fig. 1 becomes operative to lock the reaction member 38 to rotate with the impeller web member 14 whereupon the device is transformed into a turbo clutch to transmit power at a torque ratio of substantially 1:1 whereupon the curve of power transmitted is indicated by the line 135 wherein power is transmitted at a ratio of substantially 1:1 and at an efficiency of approximately 97% to 99%. This is true because there is a substantially definite ratio between impeller speed and turbine speed in the normal operation of a vehicle on the road at cruising speed for a torque converter designed for a particular vehicle. Expressed in another way the reaction member is locked with the impeller to rotate therewith when the speed of the turbine with reference to the speed of the impeller approaches a substantially predetermined value.

In the operation of turbo torque converters power is transmitted at approximately 85% efficiency at the peak illustrated by the point 133 on the curve 131. If the device continues to operate as a torque converter at a higher rotative speed of the turbine members than that corresponding to the point 133, the efficiency of the unit drops off as indicated by the portion 137 of the curve. When the rotative speed of the turbine increases to the point 139 the torque of the impeller and turbine elements becomes approximately equalized whereupon the device automatically is converted to operate as a turbo clutch to transmit power along the curve 141 at a progressively increasing efficiency.

The diagram of Fig. 7 thus illustrates the desirability of stopping the unit from operating as a torque converter and transforming it to operate as a turbo clutch at the point of maximum efficiency illustrated by the point 133 since an increase in efficiency indicated by the area within the lines 135, 137, 141 and 143 is thereby obtained.

Referring now to the embodiment of Fig. 8, the parts which correspond with the elements described above in connection with Fig. 1 have been indicated by the corresponding reference numerals with the addition of 200.

It will be observed that two impeller, turbine and reaction members are spaced apart and associated together in such a manner that axial thrust developed by operation of a single turbo unit will be neutralized whereby the diameter of the unit can be greatly decreased and axial thrust and vibration materially reduced.

An impeller web 245 is fixed at one end to the driving shaft 210 and is provided with axially spaced impeller channels 247 and 249. Primary and secondary turbine channels 251 and 253 are associated with the impeller channel 247, and primary and secondary turbine channels 255 and 257 are associated with the impeller channel 249. The axially spaced turbine elements thus formed are connected together by a member 259 operably connected to a turbine web 261 fixed to the driven shaft 216. A reaction web 263 is rotatably mounted on the driven shaft 216 and supports the axially spaced reaction chambers 265 associated with the axially spaced impeller and turbine members. The reaction web member 263 is fixed to a rotatable housing 269. The rotatable housing 269 may be operably connected to the fixed housing 212 by means of the one-way braking means 240 to hold the reaction member against rotation during certain conditions of operation.

If the reaction member is omitted or is moved to an inoperative position, the devices shown become turbo clutches to transmit power.

It is to be understood that the various features disclosed in the various figures of this application may be combined with features disclosed in other figures without departing from the spirit of the invention.

This is a continuation-in-part of my copending application Serial No. 7,896, filed Feb. 23, 1935, now Patent No. 2,205,794, issued June 25, 1940.

Features disclosed but not claimed herein are being claimed in my co-pending application, Serial Number 454,828, filed August 14, 1942.

I claim:

1. In a transmission device, a driving shaft, a driven shaft, impeller and turbine wheels associated with the driving and driven shafts, a reaction member interposed between the impeller and turbine wheels, a stationary member, one-way brake means between the reaction and stationary members, and speed responsive driving means between the reaction member and impeller to rotate the reaction member with the impeller when the impeller approaches a substantially predetermined speed.

2. A turbo unit comprising driving and driven shafts, impeller and turbine wheels associated with the driving and driven shafts, a stationary member, a reaction member, one-way braking means between the reaction member and the stationary member whereby the reaction member is capable of rotation or being held stationary, and automatically operable means controlled by impeller speed to clutch the reaction member for rotation with the impeller and turbine wheels to transform the turbo unit from a torque converter to a turbo clutch when the speed of the impeller approaches a substantially predetermined value while the turbo unit is operating as a torque converter.

3. A turbo unit comprising a driving shaft, an impeller carried by the driving shaft, a driven shaft, a turbine carried by the driven shaft, a rotatable reaction member interposed between the impeller and turbine, a rotatable housing carried by the reaction member, speed responsive driving means between the rotatable housing and impeller to clutch the rotatable housing and reaction member for rotation with the impeller and turbine to transmit power as a turbo clutch when the impeller approaches a substantially predetermined speed, a stationary housing, and one-way braking means between the rotatable housing and stationary housing to hold the reaction member from rotating to transmit power as a torque converter.

4. A turbo transmission comprising driving and driven shafts, impeller and turbine members associated with the driving and driven shafts, a guide wheel cooperating with the impeller and turbine members to form a power transmitting fluid circuit, a stationary member, one-way braking means between the stationary member and guide wheel whereby the guide wheel may be locked against rotation to operate the transmission as a torque converter, and speed responsive clutching means between the guide wheel and impeller responsive to impeller speed whereby the guide wheel may be clutched to rotate in the same direction as the impeller and turbine members rotate to operate the transmission as a turbo clutch.

5. A power transmitting device comprising driving and driven shafts, impeller and turbine members carried by the driving and driven shafts and cooperating to form a power transmitting fluid circuit, a stationary member, a guide wheel, one-way brake means between the stationary member and guide wheel, and speed responsive clutching means between the guide wheel and impeller whereby the guide wheel member may be clutched to the impeller when the driving shaft approaches a substantially predetermined rotative speed.

6. A power transmitting device comprising an impeller, a turbine driven thereby, a stationary member, a guide wheel positioned to cooperate with the impeller and turbine members to form a power transmitting fluid circuit, one-way brake means between the guide wheel and the stationary member, and speed responsive clutching means between the guide wheel member and impeller and responsive to the speed of the impeller whereby the guide wheel member may be operably connected to the impeller under certain operating conditions.

7. A power transmitting device comprising a driving shaft having an impeller, a driven shaft having a turbine, a stationary member, a rotatable housing, a guide wheel member carried by the rotatable housing, one-way braking means between the rotatable housing and stationary member, and speed responsive clutching means responsive to the speed of the impeller between the rotatable housing and the impeller.

JOSEPH JANDASEK.